US012675545B2

(12) United States Patent　(10) Patent No.: US 12,675,545 B2
Raiber et al.　(45) Date of Patent: Jul. 7, 2026

(54) SYSTEM AND METHOD FOR PROVIDING SOCIAL/PRIVATE INFORMATION WITH A SEARCH RESULT

(71) Applicant: YAHOO ASSETS LLC, New York, NY (US)

(72) Inventors: Fiana Raiber, Karmiel (IL); Yaroslav Fyodorov, Haifa (IL); Ran Moshe, Zichron Yaakov (IL); Alex Shtoff, Haifa (IL); Ilan Ben-Bassat, Tel-Aviv (IL)

(73) Assignee: YAHOO ASSETS LLC, New York, NY (US)

( * ) Notice: Subject to any disclaimer, the term of this patent is extended or adjusted under 35 U.S.C. 154(b) by 0 days.

(21) Appl. No.: 18/934,686

(22) Filed: Nov. 1, 2024

(65) Prior Publication Data

US 2026/0127240 A1　May 7, 2026

(51) Int. Cl.
*G06F 16/00*　(2019.01)
*G06F 16/9535*　(2019.01)
*G06F 16/9536*　(2019.01)
*G06F 16/957*　(2019.01)
*G06F 16/958*　(2019.01)

(52) U.S. Cl.
CPC ........ *G06F 16/986* (2019.01); *G06F 16/9535* (2019.01); *G06F 16/9536* (2019.01); *G06F 16/9577* (2019.01)

(58) Field of Classification Search
CPC .... G06F 15/16; G06F 16/152; G06F 16/2365;
G06F 16/24; G06F 16/27; G06F 16/36;
G06F 16/907; G06F 16/908; G06F
16/951; G06F 21/57; G06F 21/645; G06F
2221/03; G06F 2221/2151; G06F 3/048;
G06F 16/58; G06F 16/532; G06F 16/285;
G06F 21/316; G06F 21/44; G06F 21/32;
G06F 21/552; G06F 21/602; G06N 20/00;
G06N 20/10; G06N 5/02; H04L 63/12;
H04L 67/02; H04L 67/10; G06Q 30/02;
G06Q 30/0222; G06Q 20/02
See application file for complete search history.

(56) References Cited

U.S. PATENT DOCUMENTS

2009/0100041 A1 * 4/2009 Wilson .................... G06F 16/24
　　　　　　　　　　　　　　　　707/999.005
2011/0218948 A1 * 9/2011 De Souza ............. G06N 20/00
　　　　　　　　　　　　　　　　706/12
2012/0110458 A1 * 5/2012 Brown .................... G06F 16/27
　　　　　　　　　　　　　　　　715/733

* cited by examiner

*Primary Examiner* — Shyue Jiunn Hwa
(74) *Attorney, Agent, or Firm* — Venable LLP

(57) ABSTRACT

The present teaching relates to providing content. Online documents are searched based on a query from a user. For each searched online document, enriched information thereof is created based on social data associated thereto and, if existing, private information previously provided by the user to privately evaluate the online document. An enhanced search result is generated based on the online documents with their respective enriched information and provided to the user in response to the query.

20 Claims, 10 Drawing Sheets

300

340

600

SYSTEM AND METHOD FOR PROVIDING SOCIAL/PRIVATE INFORMATION WITH A SEARCH RESULT

BACKGROUND

1. Technical Field

The present teaching generally relates to information processing. More specifically, the present teaching relates to providing content.

2. Technical Background

With the development of the Internet and the ubiquitous network connections, daily activities are often conducted online. Millions of user access, via network connections, digital content to keep informed of what is going on in the world. Such online digital content may be obtained via, e.g., a search engine, which may identify online content based on queries provided by users. Searching online content has become an essential part of daily lives of most and online content includes news, articles, music pieces, video content, communications, sales, as well as discussions directed to different topics. FIG. 1 illustrates an example search result generated by a search engine based on an example search query ("hurricane in 2024 florida"). This is a typical search result with a list of hyperlinks representing respective online documents related to the query. Although such a search result provides the user a list of online documents, a determination of which document offers the information the user is seeking still requires the user to browse through the hyperlinked documents.

Because the search result as illustrated in FIG. 1 does not provide information that can assist a user to make a determination as to what may be useful, identifying the useful document(s) from a search result remains inefficient and even burdensome, making the process of finding useful information time consuming. In addition, if a user finds some online document that is worthwhile to revisit and likes to mark it as such, a user has no means to do so except by saving the hyperlink or the online document and save on some other platform, requiring switching back and forth between different platforms. Alternatively, the user may perform another search next time using, e.g., the same query, hoping that the next search result will include the same online document. As such, the traditional online search approach does not facilitate a user to effectively identify what they are looking for.

Thus, there is a need for developing an approach to overcome the shortcomings associated with the current state of the art.

SUMMARY

The teachings disclosed herein relate to methods, systems, and programming for information management. More particularly, the present teaching relates to methods, systems, and programming related to content summarization.

In one example, a method, implemented on a machine having at least one processor, storage, and a communication platform capable of connecting to a network for providing content. Online documents are searched based on a query from a user. For each searched online document, enriched information thereof is created based on social data associated thereto and, if existing, private information previously provided by the user to privately evaluate the online document. An enhanced search result is generated based on the online documents with their respective enriched information and provided to the user in response to the query.

In a different example, a system is disclosed for providing content that includes a user interaction unit and a content search engine. The user interaction unit is provided for receiving a query from a user. The content search engine is provided for generating an enhanced search result based on the query and creating enriched information for each of the online documents based on social data associated thereto and, if existing, private information previously provided by the user to privately evaluate the online document is created. The enhanced search result combines each of the online documents with its respective enriched information and is provided to the user in response to the query.

Other concepts relate to software for implementing the present teaching. A software product, in accordance with this concept, includes at least one machine-readable non-transitory medium and information carried by the medium. The information carried by the medium may be executable program code data, parameters in association with the executable program code, and/or information related to a user, a request, content, or other additional information.

Another example is a machine-readable, non-transitory and tangible medium having information recorded thereon for providing content. Online documents are searched based on a query from a user. For each searched online document, enriched information thereof is created based on social data associated thereto and, if existing, private information previously provided by the user to privately evaluate the online document. An enhanced search result is generated based on the online documents with their respective enriched information and provided to the user in response to the query.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to facilitate a thorough understanding of the relevant teachings. However, it should be apparent to those skilled in the art that the present teachings may be practiced without such details. In other instances, well known methods, procedures, components, and/or system have been described at a relatively high-level, without detail, in order to avoid unnecessarily obscuring aspects of the present teachings.

Figure 1:
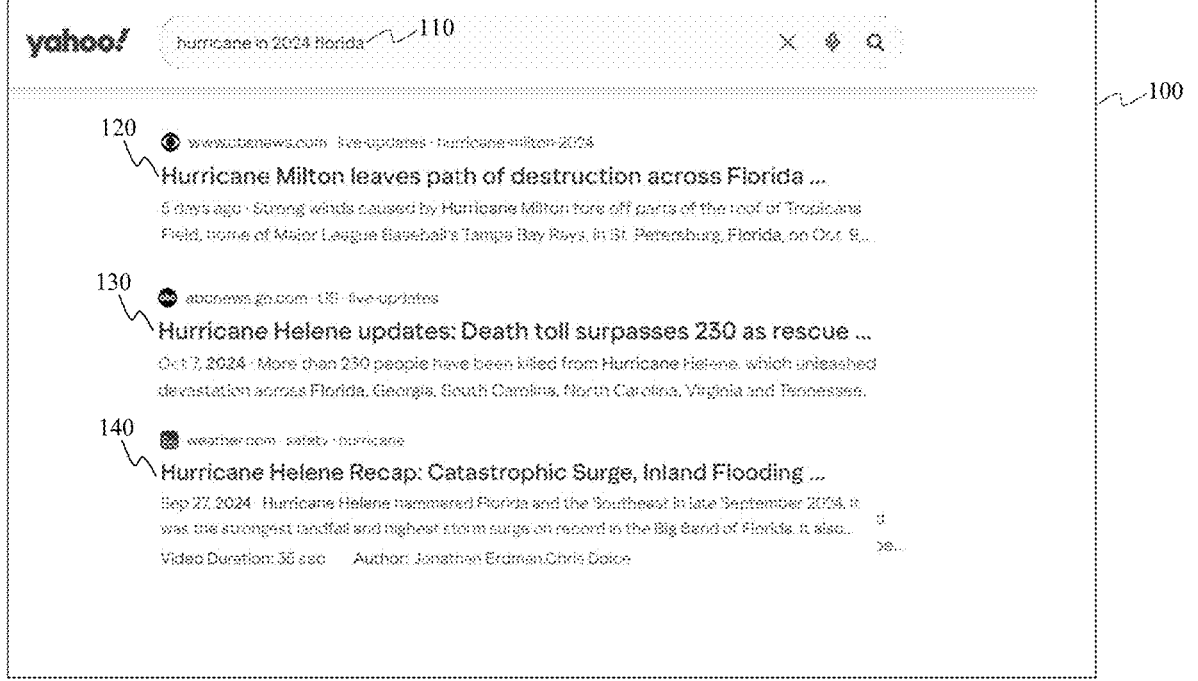
FIG. 1 illustrates a traditional search page with an exemplary search result listing hyperlinked online documents obtained based on a search query.
Figure 2A:
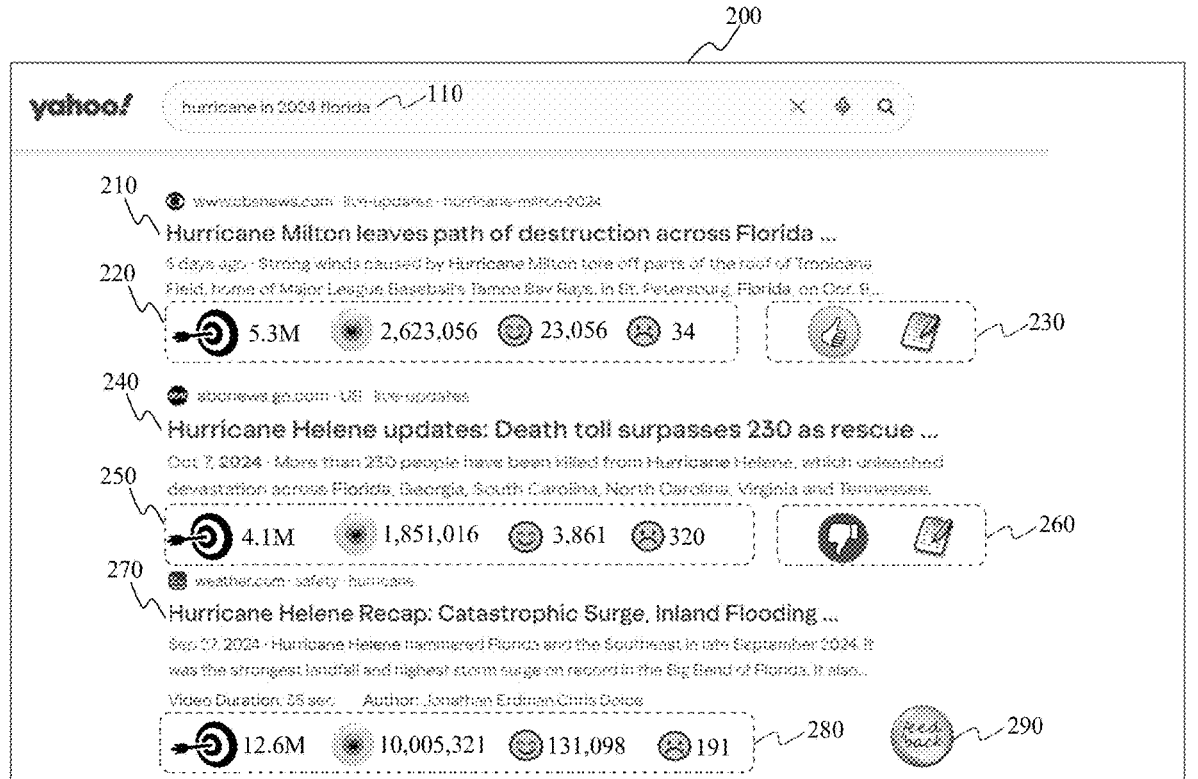
FIG. 2A depicts an exemplary search result with a list of hyperlinked online documents, each of which is provided with social and/or private information associated thereto, in accordance with an embodiment of the present teaching.

The present teaching discloses an enhanced content search framework for searching online documents related to a query and providing enriched information for the online documents included in the search result (e.g., the links appearing on the first page) to assist a user to evaluate the searched content. The enriched information provided with each hyperlinked online document in a search result may include summarized social data relating to the online document and optionally, private evaluation provided specifically by a user engaged in the search. This is illustrated in FIG. 2A, which depicts an exemplary enhanced search result with a list of hyperlinked online documents and social data and/or private information associated thereto, in accordance with an embodiment of the present teaching. In FIG. 2A, on a search webpage 200, a search is conducted based on a query 110 ("hurricane in 2024 florida") and produces an enhanced search result with a list of hyperlinked online documents 210, 240, 270, . . . . Under each of the hyperlinked document, enriched information is presented to provide information to the user as to the social reaction to each of the online document and, if any, the private evaluation of the same user made previously when the user encountered the same online document.

As discussed herein, the enriched information may include social and optionally private information. In some embodiments, social information related to a searched online document may include, e.g., a total number of hits of the online document in all searches, a total number of views of the online document, a number of positive feedback on the online document, and a number of negative feedback on the online document. For illustrated in FIG. 2A, for online document 210, its social information may be provided in 220 and its private information (private to the user who executed the search using query "hurricane in 2024 florida") may be provided in 230. Similarly, for online document 240, its social information may be provided in 250 and its private information may be provided in 260. With respect to online document 270, its social information is provided in 280. As this online document may not have any private information in connection with the user, an actionable icon 290 with text "Feedback" may be provided instead, which may allow the user, once activated, to provide, for archive, the user's personal view of the online document 270 as private information specific to the user. For instance, at a click of 290, an interface may be provided to the user with selectable choices on entering different types of private information including, e.g., positive feedback, negative feedback, or writing a private note.

The enriched information may be presented using symbols such as emojis. In FIG. 2A, an emoji with an arrow in left most position of 220 (so as in 250 and 280) may be used to indicate a total number of hits of the online document in online searches; an emoji with an eyeball at the second most left position of 220 (so as in 250 and 280) may be used to indicate a total number of views of the online document; an emoji with a smiley face in the third position from the left of 220 (so as in 250 and 280) may be used to indicate a number of positive feedback; and an emoji with an angry face at the most right position of 220 (so as in 250 and 280) may be used to indicate a number of negative feedback for the online document. After each emoji, a corresponding statistic is provided, e.g., for online document 210, it is a hit 5.3 million times in all searches; the document 210 is viewed by 2,623,056 users; 23,056 users reacted positively, and 34 users reacted negatively.

It is noted that although certain emojis are provided in FIG. 2A to disclose certain aspects of the present teaching, they are merely for illustration purposed and are not intended as limitations to the present teaching. Any other appropriate emojis may be used. For instance, instead of the smiley and crying faces, emojis with thumbs up and thumbs down may also be used to indicate "like" and "dislike," respectively. In addition, in some situations, depending on the nature of the corresponding online document, the associated emojis used for the online document may vary to reflect, e.g., sensitivity. For example, if an online document is about a disaster, the social statistics may be changed to either "accurate" or "inaccurate," which may be represented by respectively emojis to invite feedback from readers to provide input as to the accuracy of information reported in the online document. In some situations, the content of an online document may be such that the enhanced search engine 340 may automatically determine collect only the number of hits and the number of views of the document without any solicit any information on the reactions of viewers.

With respect to an online document, private information refers to the previous feedback on the same online document from the same user who is performing the current search. Because of that, with respect to a user performing the current search, there may or may not be private information with respect to an online document included in the current search result. As shown in FIG. 2A, there is no private information in connection with online document 270 with respect to the user in the current search. In this case, an emoji 290 (with an inviting word "feedback") may be presented to seek the user's private feedback. If the user clicks on 290, the present teaching as disclosed herein may present to the user multiple selectable choices as to types of private information and facilitate the user to provide an elected type of private information. Such provided private information may be archived so that such private information will be presented to the user next time when the user encounters the same online document 270 again in a future search.

A user's private information with respect to an online document may include a personal evaluation of the online document such as "like" or "dislike" and/or a private note that the user may create with specific personal assessment after viewing the online document. This is illustrated in 230 and 260. Different types of private information may also be offered using emojis. Private positive feedback may be presented using an emoji with "thumbs up" and private negative feedback may be presented using an emoji with "thumbs down," as illustrated in 230 and 260, respectively. As discussed herein, the emojis provided in FIG. 2A for marking a user's private assessment of an online document for illustration, instead of as limitations. Any other appropriate emojis may be used and the emojis adopted associated with the online document may vary based on the nature or content of the online document.

In some embodiments, a private evaluation from an individual user not only may be recorded as private information with respect to the user, but it may also be incorporated in the social information for the same online document. For example, hit of an online document included in a search result for a user will be user to increment the total number of hits of the online document; the user's clicking or viewing of the online document may be used to increment the total number of views of the online document; the user's private positive feedback on the online document may be used to increment the total number of positive reaction of the population; and the user's private negative feedback may be used to increment the total number of negative reaction of the population.

In addition to private positive or negative feedback to an online document, a user may also provide a private note with comments or assessment of the online document. For instance, when a user clicks on the private feedback emoji 290, the user may be provided with a choice of whether the user desires to create a private note. When the user selects to create a private note, an appropriate interface (a popup window) may be provided so that the user may create a private note therein. Such a private note may be archived with respect to the creator user in connection with the specific online document so that if the online document is a hit in a future search performed by the same user, the enhanced content search framework according to the present teaching may indicate in the enriched information that informs the user that a private note by the same user on the same document was previously created. This is shown in FIG. 2A, where an emoji with a notepad may be presented so that the user may click on the emoji to review the previously created note. In this manner, the user may be informed of his/her prior evaluation and a review of the same may assist the user to assess the value of the underlying online document.

In some embodiments, the content of a private note from each user may be automatically leveraged by the enhanced search engine 340, with explicit permission of such users. For instance, the online document together with the user's evaluation (e.g., a thumbs up) and some key assessment in the private note from the same user on the online document (e.g., incredibly accurate, moving, etc.) may be forwarded to others to promote the online document. The scope of the distribution of the online document may be determined, e.g., others in the user's social circle or others that share the same interest(s) associated with the online document. Similarly, for an online document that a user evaluated negatively and optionally with specificities expressed in a private note may also be distributed to others to demote the online document.

Figure 2B:
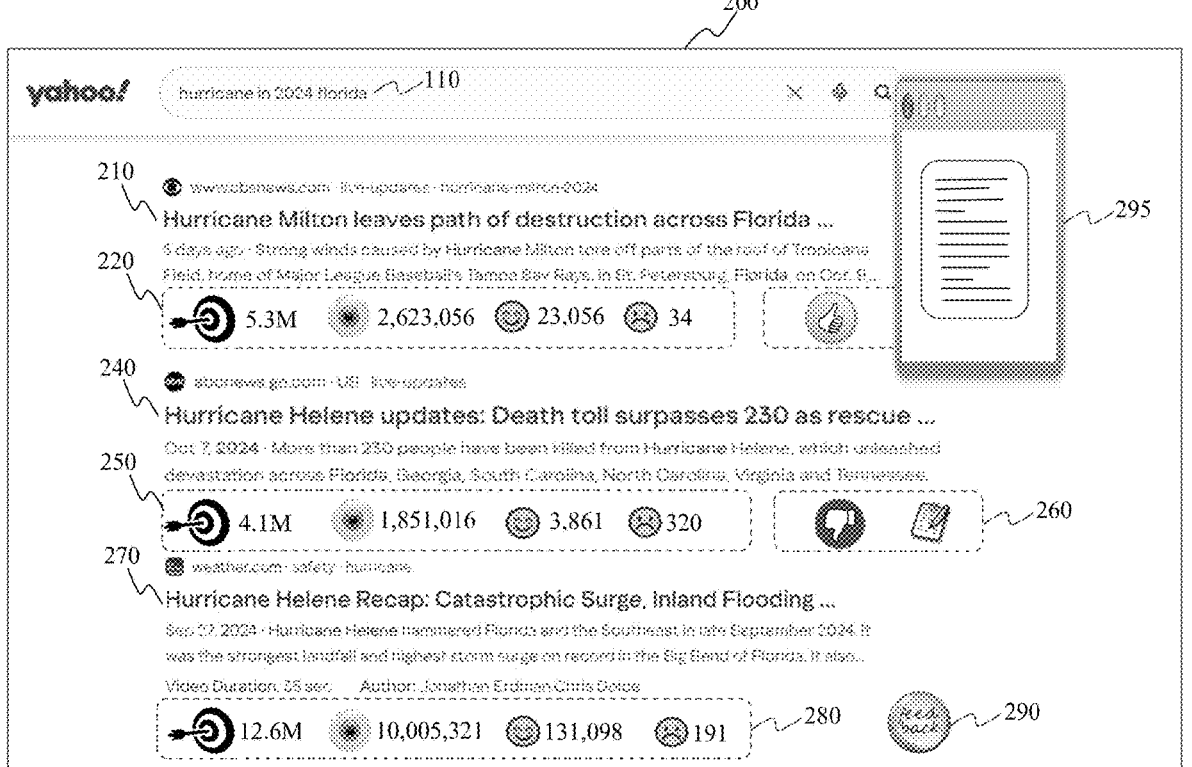
FIG. 2B shows an example of displaying, at a user's choice with respect to a hyperlinked online document, a private note previously provided by the user, in accordance with an embodiment of the present teaching.

FIG. 2B shows an example of displaying, at a user's choice with respect to a hyperlinked online document, a private note previously created by the user, in accordance with an embodiment of the present teaching. In this example, with respect to online document 210 in the search result, it is detected that the user performing the example search as illustrated therein had encountered the same online document and evaluated the same previously, including a "thumbs up" feedback and a private note. If the user clicks on the notepad emoji to request to view the previously created private note, the enhanced content search framework according to the present teaching may retrieve, from the archive, the private note and display the same to the user in, e.g., a separate popup window 295.

Figure 3:
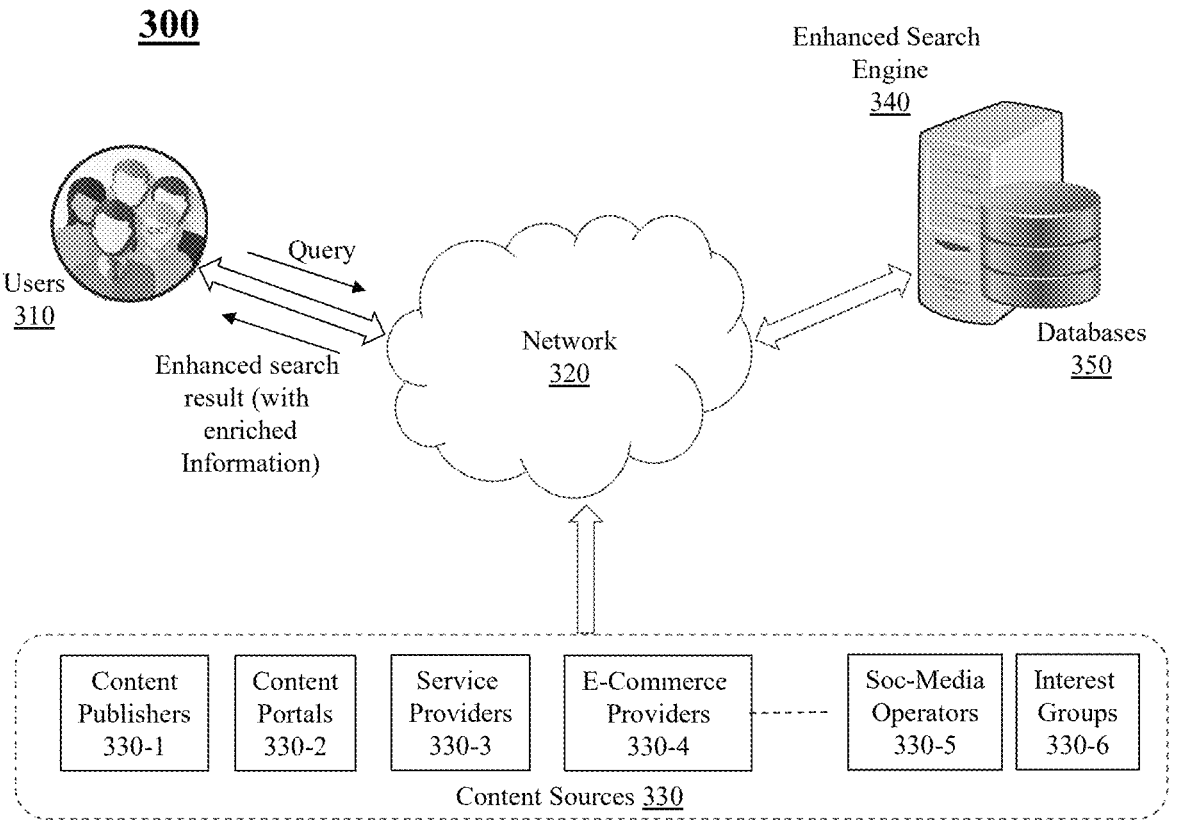
FIG. 3 depicts an online search environment with an enhanced search engine capable of providing not only a search result including both hyperlinks representing online documents and social/private information associated thereto, in accordance with an embodiment of the present teaching.

FIG. 3 depicts an online search environment 300 with an enhanced search engine capable of providing enhanced search result, which includes not only a search result with hyperlinks representing searched online documents but also enriched information (social/private information) associated thereto, in accordance with an embodiment of the present teaching. The illustrated online search environment 300 includes users 310, content sources 330, and an enhanced search engine 340 with different databases 350, which are connected with each other via network 320. Content sources 330 may include, e.g., content publishers 330-1, content portals 330-2, service providers 330-3, e-commerce providers 330-4, . . . , social media operators 330-5, and online interest groups 330-6. The entities in 330 may make certain of their content available online or searchable. To search online content, each user may connect with the enhanced search engine 340 via network 320 to provide a query and to receive enhanced search result (search result with enriched information). Upon receiving a query, the enhanced search engine 340 identifies, from either content from content sources 330 or from its own archive, content according to the query to generate a search result. With respect to each of the online documents included in the search result, social reactions on these documents and, if present, private information associated with different documents may then be retrieved from the databases 350 and incorporated with the search result to generate an enhanced search result, as presented in FIGS. 2A-2B.

The enhanced search engine 340, as compared with conventional search engines, provides not only the online documents relevant to a query but also enriched information (social reaction summary and private information) that may be used by a user to readily assess, e.g., the popularity, the social reaction/value, and feedback of others for each online document. This may assist the user to select certain documents in the search result to review, as opposed to blindly choose to review some as with a conventional search engine. In addition, if a user had reviewed and assessed an online document before in a personal manner, the enhanced search engine 340 according to the present teaching is provided to recognize the same and to retrieve such previously archived private information, making it readily accessible only to the same user (as it is private). Such private information further assists a user to determine which online document in a search result to review, to skip, or to pick up where the user had left off last time. Details of the enhanced search engine are provided herein with reference to FIGS. 4A-5B.

Figure 4A:
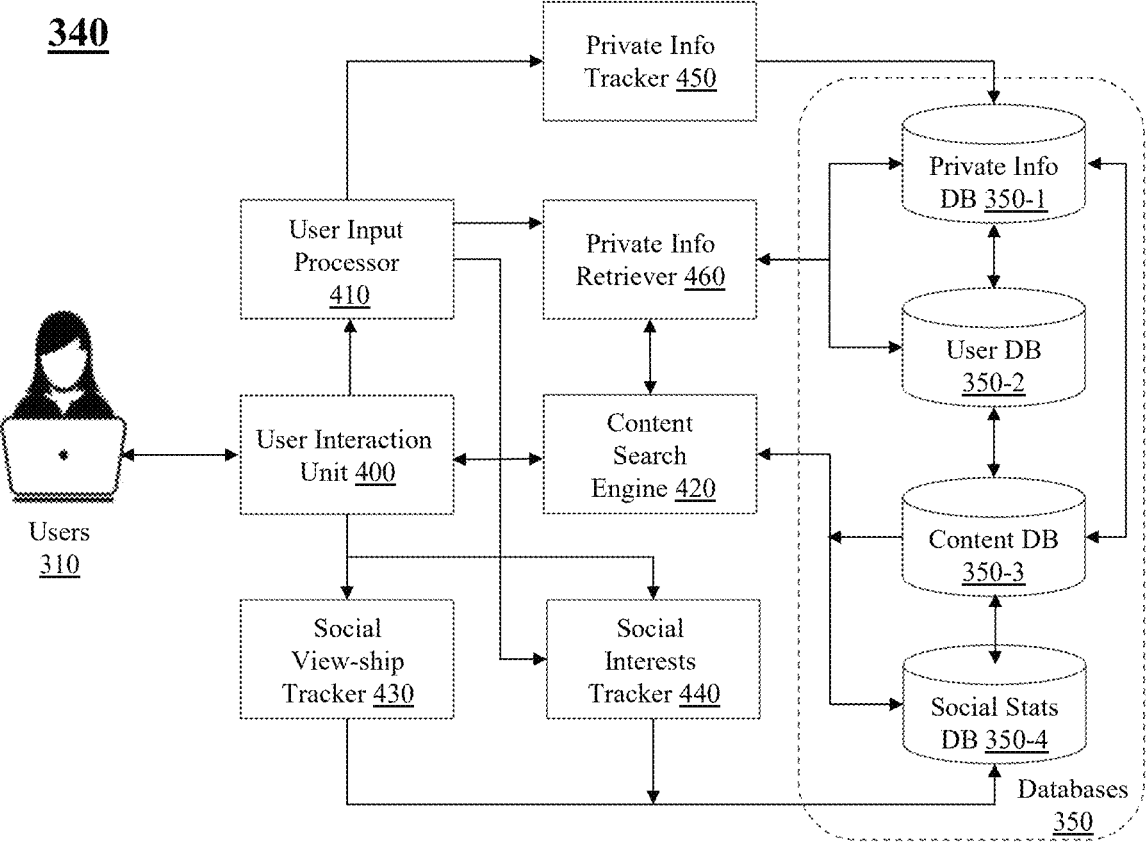
FIG. 4A depicts an exemplary high level system diagram of an enhanced search engine, in accordance with an embodiment of the present teaching.
Figure 4B:
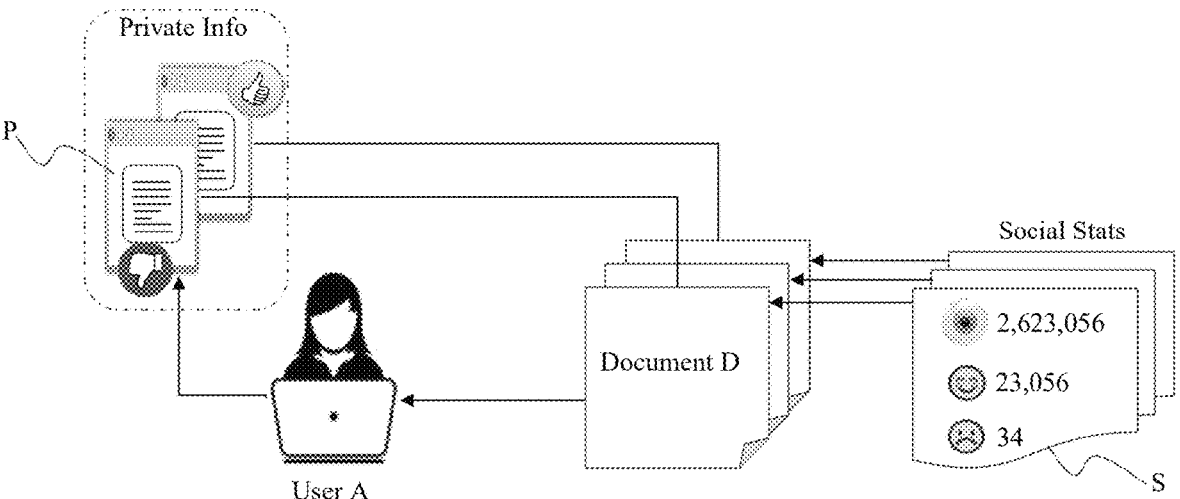
FIG. 4B shows how exemplary types of information on users, online content, social interests, and private notes are related via an enhanced search engine, in accordance with an embodiment of the present teaching.

FIG. 4A depicts an exemplary high level system diagram of the enhanced search engine 340, in accordance with an embodiment of the present teaching. In this illustrated embodiment, the enhanced search engine 340 comprises a user interaction unit 400, a user input processor 410, a content search engine 420, a social view-ship tracker 430, a social interest tracker 440, a private information tracker 450, and a private information retriever 460. As discussed herein, to facilitate the capabilities of providing enriched information (social and private) together with the searched online documents (as shown in FIG. 2A), the enhanced search engine 340 includes databases 350. As illustrated in FIG. 4A, in some embodiments, the databases 350 may comprise a user database 350-2, a content database 350-3, a social statistic database 350-4, and a private information database 350-1. Although these databases store different types of information, they may be cross-indexed based on relationships between/among different pieces of information. This is illustrated in FIG. 4B, which shows how different types of information about users, online content, social interests, and private notes are related in the enhanced search engine 340 to facilitate the functions to be achieved in accordance with an embodiment of the present teaching. As shown, a user A (recorded in user database 350-2) may have reviewed an online document D (linked to content database 350-3), which is linked to both a record S of social statistics on the online document D (linked to the social statistic database 350-4) and a record P of private information associated with both D and A.

The user interaction unit 400 may be provided for interfacing with a user to, e.g., receive query, provide an enhanced search result (a search result with enriched information on social/private information), monitor user activities on user's selection of online document to review, indication of liking or disliking of an online document, requesting to record private assessment, and forward different received information to other appropriate units. The content search engine 420 may be provided to search online documents matching the user's query, either from the content sources 330 via the network 320 or from its own archive in content database 350-3. Based on the hits in each search, the content search engine 420 may update relevant social statistics such as the number of hits associated with each searched online document.

To generate an enhanced search result (with both content matching with the query and the enriched information on social/private data), the content search engine 420 may search, with respect to each online document included in the current search result, both the social statistics associated thereto (from the social statistic database 350-4). Furthermore, if the same user has recorded any private information associated with the online document previously, the content search engine 420 may invoke the private information retriever 460 to search the private information associated with the online document with respect to the current user. The private information retriever 460 may retrieve, based on the user identifier provided by the user input processor 410, the private information previously provided by the same user that is directed to the same current online document. The retrieved private information is then provided to the content search engine 420 to be used to generate an enhanced search result.

With the hit online documents related to the query, the social statistics associated with each of the online (from the social statistic database 350-4), the available private information (from the private information database 350-1) or lack thereof, the content search engine 420 may generate an enhanced search result (as illustrated in FIG. 2A), which includes a list of hyperlinks pointing to the online documents, each of which has associated social statistics (as in 220, 250, 280), optionally private information (as in 230 and 260) the same user previously provided with respect to the online document, or an actionable icon (e.g., 290) inviting the user to provide his/her feedback/private note directed to the online document. The enhanced search result is then provided to the user interaction unit 400 to be presented to the user. Once the enhanced search result is presented to the user, the user activities may be monitored by the user interaction unit 400 and the monitored information is used to update the social statistics and private information associated with each of the online documents included in the search result. For example, if the user clicks on an online document in the search result, this information may be provided to the social view-ship tracker 430, which may proceed to update the viewing related statistic in the social statistic databased 350-4 to, e.g., increment the count on the number of views associated with the online document. If the user provides positive feedback (e.g., clicking on the emoji for positive feedback) on an online document in the enhanced search result, information on such feedback may be provided to the social interest tracker 440, which may then update an appropriate statistic associated with the positive feedback by, e.g., increment on a count of the number of positive feedback for the online document. Similarly, if the user clicks on the emoji for negative feedback, the social interest tracker 440 may accordingly increment the count of the number of negative feedback for the online document.

In some situations, a user may want to provide private feedback to ensure that the user will be able to see his/her prior feedback in the future. In this case, the user may elect to click on the feedback emoji 290 in FIG. 2A. In this situation, the user input processor 410 may be invoked to process the input from the user. As discussed herein, whenever a user clicks on 290, the enhanced search engine 340, or specifically the user input processor 410 therein may provide multiple actionable icons in an interface to the user, e.g., a "like," a "dislike," and a "provide note" for the user to elect to provide the intended private information. If the user selects either the "like" or the "dislike" icon, the user input processor 410 may invoke the private information tracker 450 to record accordingly the user's private feedback, in the private information database 350-1, in connection with the specific user and with respect to the specific online document. In the meantime, the user input processor 410 may also pass on the user's election (like or dislike) to the social interest tracker 440 so that the user's opinion of the online document may also be counted as part of the public opinion of the online document. If the user elects to enter a private note, the user input processor 410 may provide, through the user interaction unit 400, a dialogue box for the user to write a private note. Upon receiving the private note submitted by the user, the private information tracker 450 may then store the private note in connection with the specific user and with respect to the specific online document in the private information database 350-1.

If a user had previously provided private information with respect to an online document (so that the enhanced search result is presented with such previously created private information), the enhanced search engine 340 may be configured to allow the user to modify the private information. In some embodiments, such modification may be activated by clicking on the specific emoji related to the private information so that the private information may be re-entered. In case of a private note, the previously recorded private note may be displayed in a window and operating in a modification mode to allow the user to edit the private note. The modified private information may be used to update the information previously stored in the private information database 350-1. Similarly, when a user modifies his/her private evaluation of an online document, the changed evaluation (e.g., changed from "dislike" to "like") may be forwarded from the user input processor 410 to the social interest tracker 440 so that the statistics associated with the online document may also be accordingly modified in the social statistics database 350-4.

Figure 5A:
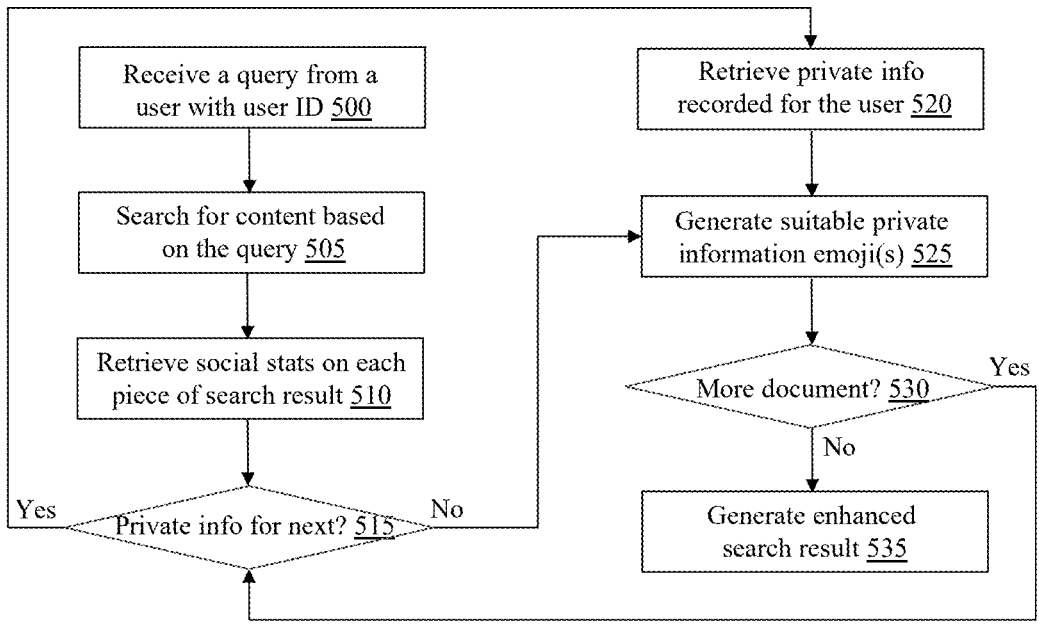
FIG. 5A is a flowchart of an enhanced search engine to provide a search result with hyperlinked online documents having social and/or private information associated thereto, in accordance with an embodiment of the present teaching.

FIG. 5A is a flowchart of a part of the enhanced search engine 340 for generating an enhanced search result based on a query with hyperlinked online documents as well as enriched social and/or private information associated thereto, in accordance with an embodiment of the present teaching. When the content search engine 420 receives, at 500, a query from a user, it searches, at 505, content (online documents) related to the query. In some embodiments, the content search engine 420 may first update the number of hits of the online documents stored in the social statistic database 340-5. To create the enriched information for the online documents, the content search engine may then retrieve, at 510, social statistics (i.e., the updated total hits, the total views, the total likes, and the total dislikes) associated with each of the online documents. For each of the online documents, it is then detected, at 515, whether private information for this user with respect to this online document is available.

If such specific private information does exist, the private information retriever 460 retrieves, at 520, such specific private information from the private information database 340-1. In this case, the enriched private information to be presented with the online document may be represented using, e.g., emoji(s) that correspond to what the same user had previously created, e.g., either an emoji for "like" or "dislike" or an emoji for a private note if present. If such specific private information does not exist, determined at 515, then a different emoji may be presented (e.g., 290) to invite the user to provide personal input about the online document. In either case, the content search engine 420 my generate, at 525, suitable representation for the private information with respect to the online document. The process for determining how to present the private information with respect to the online documents in the search result continues until online documents are considered, determined at 530. At this point, the content search engine 340 may then generate, at 535, an enhanced search result as a response to the user's query that incorporates the search result (with online documents) as well as the enriched information including, e.g., the social statistics (e.g., 220, 250, and 280) and the private information (e.g., 230, 260, 290) associated with each of the online documents in the search result, as illustrated in FIG. 2A.

Figure 5B:
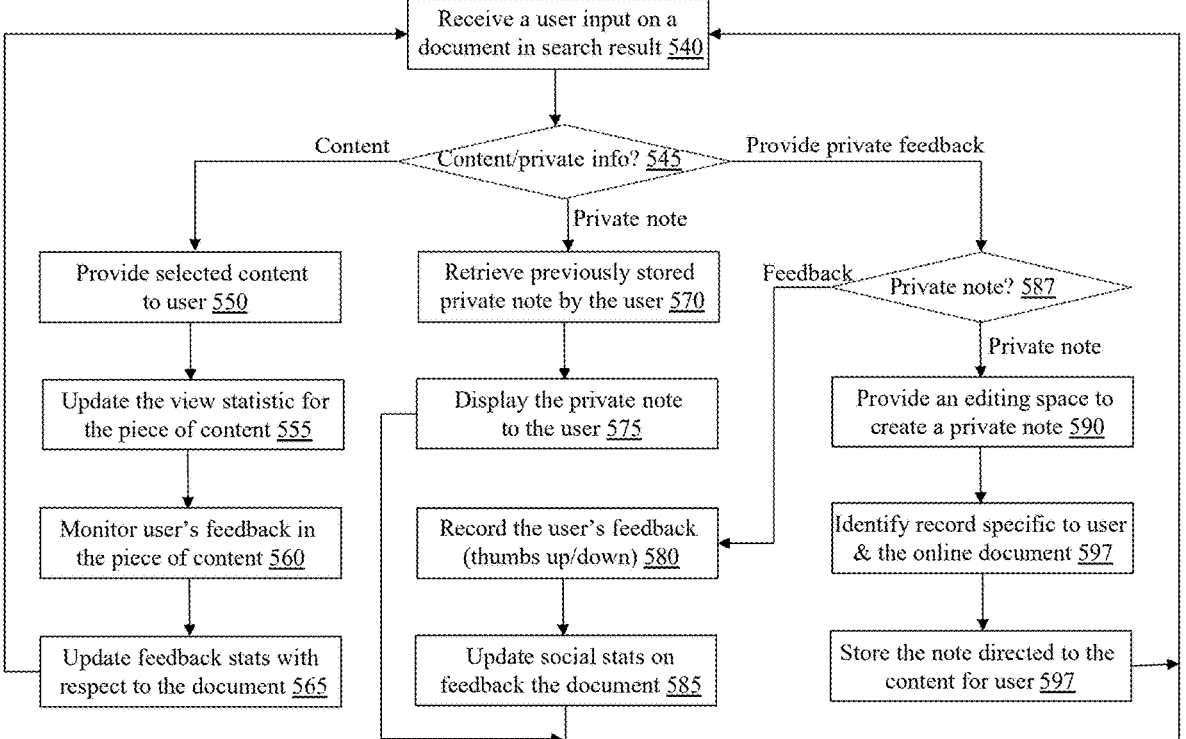
FIG. 5B is a flowchart of an enhanced search engine to update, based on user activities, the social and/or private information with respect to each online document in a search result, in accordance with an embodiment of the present teaching.

FIG. 5B is a flowchart of the enhanced search engine 340 for monitoring user activities to update social statistics and/or private information with respect to each online document in a search result, in accordance with an embodiment of the present teaching. Upon providing an enhanced search result to a user in response to a user's query, when an input is received at 540, representing an activity of the user directed to a specific online document in the search result, the nature of the input is determined at 545. If the input selects one of the online documents in the search result for review (e.g., by clicking on a hyperlink), the selected online document is provided, at 550, to the user. Accordingly, corresponding social statistic on the number of views related to the online document may be updated at 555 (e.g., increment by one). The user activity related to the online document may further be monitored as to feedback at 560, e.g., whether the user chooses to provide either positive or negative feedback. According to any monitored feedback, the social statistics (the count of "like" or the count of "dislike") associated with the online document may be accordingly updated at 565.

If the input from the user is to review a private note previously stored, determined at 545, the private note previously provided by the user is retrieved at 570 and displayed at 575 to the user. The input from the user may also be to provide private information, determined at 545, which may either be providing new private information by, e.g., clicking on 290 emoji, or to modifying existing private information. In either situation, it is further determined, at 587, whether the user desires to provide a private note or private feedback (positive as thumbs up or negative as thumbs down). If the user intends to give feedback, the user's feedback is recorded, at 580, in the private information databased 340-1 with respect to the user and in connection with the specific online document. In the meantime, the social statistics associated with the online document may also be accordingly updated based on the user's input at 585. If the user's input indicates that the user intends to provide a private note (either a new or modify an existing one), an editing space may be provided, at 590, to allow the user to create a private note. In the case that there is an existing private note, the existing private note may first be retrieved and displayed in the editing space to allow the user to modify the existing note. To store such a created/modified private note, a record in the private information database 340-1 specific to the user as well as to the online document may be identified, at 595, so that the created/modified private note may be stored appropriately, at 597, in the private information database 340-1 under the user and with respect to the online document. After processing each of the input from the user, under different circumstances as determined at 545, the process returns to 540 to receive the next user input.

Figure 6:
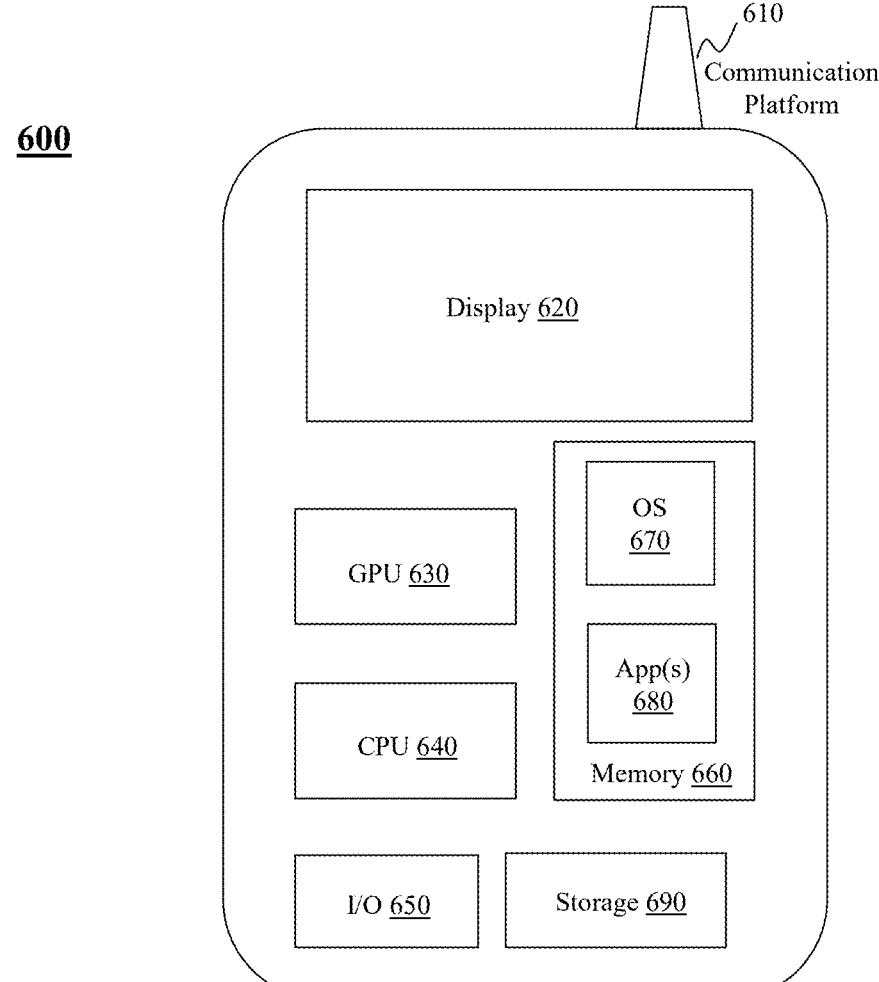
FIG. 6 is an illustrative diagram of an exemplary mobile device architecture that may be used to realize a specialized system implementing the present teaching in accordance with various embodiments.

FIG. 6 is an illustrative diagram of an exemplary mobile device architecture that may be used to realize a specialized system implementing the present teaching in accordance with various embodiments. In this example, the user device on which the present teaching may be implemented corresponds to a mobile device 500, including, but not limited to, a smart phone, a tablet, a music player, a handled gaming console, a global positioning system (GPS) receiver, and a wearable computing device, or in any other form factor. Mobile device 600 may include one or more central processing units ("CPUs") 640, one or more graphic processing units ("GPUs") 630, a display 620, a memory 660, a communication platform 610, such as a wireless communication module, storage 690, and one or more input/output (I/O) devices 650. Any other suitable component, including but not limited to a system bus or a controller (not shown), may also be included in the mobile device 500. As shown in FIG. 6, a mobile operating system 670 (e.g., iOS, Android, Windows Phone, etc.), and one or more applications 680 may be loaded into memory 660 from storage 690 in order to be executed by the CPU 640. The applications 680 may include a user interface or any other suitable mobile apps for information analytics and management according to the present teaching on, at least partially, the mobile device 600.

User interactions, if any, may be achieved via the I/O devices 650 and provided to the various components connected via network(s).

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to appropriate settings as described herein. A computer with user interface elements may be used to implement a personal computer (PC) or other type of workstation or terminal device, although a computer may also act as a server if appropriately programmed. It is believed that those skilled in the art are familiar with the structure, programming, and general operation of such computer equipment and as a result the drawings should be self-explanatory.

Figure 7:
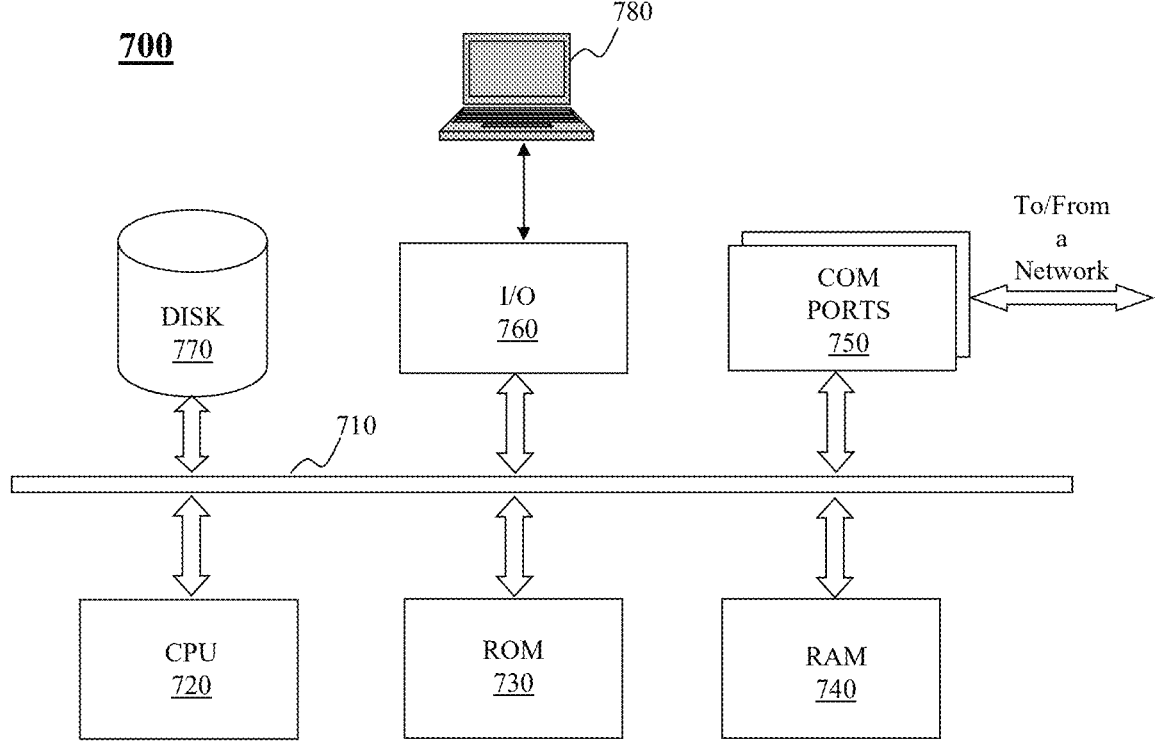
FIG. 7 is an illustrative diagram of an exemplary computing device architecture that may be used to realize a specialized system implementing the present teaching in accordance with various embodiments.

FIG. 7 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 700 may be used to implement any component or aspect of the framework as disclosed herein. For example, the information analytical and management method and system as disclosed herein may be implemented on a computer such as computer 700, via its hardware, software program, firmware, or a combination thereof. Although only one such computer is shown, for convenience, the computer functions relating to the present teaching as described herein may be implemented in a distributed fashion on a number of similar platforms, to distribute the processing load.

Computer 700, for example, includes COM ports 750 connected to and from a network connected thereto to facilitate data communications. Computer 700 also includes a central processing unit (CPU) 720, in the form of one or more processors, for executing program instructions. The exemplary computer platform includes an internal communication bus 710, program storage and data storage of different forms (e.g., disk 770, read only memory (ROM) 730, or random-access memory (RAM) 740), for various data files to be processed and/or communicated by computer 700, as well as possibly program instructions to be executed by CPU 720. Computer 700 also includes an I/O component 760, supporting input/output flows between the computer and other components therein such as user interface elements 780. Computer 700 may also receive programming and data via network communications.

Hence, aspects of the methods of information analytics and management and/or other processes, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with information analytics and management. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution, e.g., an installation on an existing server. In addition, the techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, comprising:

receiving a query from a user;

searching content based on the query, wherein the content that matches the query includes a plurality of documents;

with respect each of the plurality of documents,
- obtaining social data associated with the document, wherein the social data represents public evaluation of the document,
- retrieving accessible private information provided by the user previously with respect to the document to assess the document, and
- generating an enhanced record including the document and enriched information thereof which includes the social data and accessible private information;

generating an enhanced search result based on the plurality of enhanced records; and presenting the enhanced search result on a webpage to the user in response to the query, wherein the presented enhanced search result includes each of the plurality of documents, the corresponding social data, and the corresponding accessible private information, and wherein the document, the corresponding social data, and the corresponding accessible private information are displayed separately from each other on the webpage.

2. The method of claim 1, wherein the social data associated with the document comprises statistics which includes:

a total number of hits of the document in different searches;

a total number of times that the document is reviewed;

a total number of positive feedback by viewers; and a total number of negative feedback by viewers.

3. The method of claim 1, wherein the private information associated with the document includes at least one of:

a private assessment of the document; and a private note that the user previously created for the document, wherein the private information directed to the document is to be provided only to the user, and the private assessment indicates whether the user likes or dislikes the document.

4. The method of claim 1, wherein the enriched information related to the document is to be displayed together:

the social data in the enriched information represents a public assessment of the document; and the private information in the enriched information, if existing, presents a private evaluation previously made by the user about the document.

5. The method of claim 1, further comprising:

receiving an input from the user after the enhanced search result is provided to the user;

when the input is a request to review one of the plurality of documents, providing the user content of the document, monitoring feedback from the user on the document, updating the social data associated with the document based on the feedback from the user.

6. The method of claim 5, further comprising:

if the input is a request to review a private note in the private information created previously by the user with respect to the document, retrieving the previously created private note, providing to the user the retrieved private note.

7. The method of claim 6, further comprising:

if the user requests to privately evaluate the document, receiving information from the user representing a private evaluation of the document, and updating the private information associated with the user with respect to the document based on the private evaluation, and updating the social data associated with the document based on the private evaluation from the user; and if the user requests to privately evaluate the document, facilitating the user to create a private note about the document, updating the private information associated with the user with respect to the document based on the private note.

8. A machine-readable and non-transitory medium having information recorded thereon, wherein the information, when read by the machine, causes the machine to perform the following steps:

receiving a query from a user;

searching content based on the query, wherein the content that matches the query includes a plurality of documents;

with respect each of the plurality of documents,
- obtaining social data associated with the document, wherein the social data represents public evaluation of the document,
- retrieving accessible private information provided by the user previously with respect to the document to assess the document, and
- generating an enhanced record including the document and enriched information thereof which includes the social data and accessible private information;

generating an enhanced search result based on the plurality of enhanced records; and presenting the enhanced search result on a webpage to the user in response to the query, wherein the presented enhanced search result includes each of the plurality of documents, the corresponding social data, and the corresponding accessible private information, and wherein the document, the corresponding social data, and the corresponding accessible private information are displayed separately from each other on the webpage.

9. The medium of claim 8, wherein the social data associated with the document comprises statistics which includes:

a total number of hits of the document in different searches;

a total number of times that the document is reviewed;

a total number of positive feedback by viewers; and a total number of negative feedback by viewers.

10. The medium of claim 8, wherein the private information associated with the document includes at least one of:

a private assessment of the document; and a private note that the user previously created for the document, wherein the private information directed to the document is to be provided only to the user, and the private assessment indicates whether the user likes or dislikes the document.

11. The medium of claim 8, wherein the enriched information related to the document is to be displayed together:

the social data in the enriched information represents a public assessment of the document; and the private information in the enriched information, if existing, presents a private evaluation previously made by the user about the document.

12. The medium of claim 8, wherein the information, when read by the machine, further causes the machine to perform the following steps:

receiving an input from the user after the enhanced search result is provided to the user;

when the input is a request to review one of the plurality of documents, providing the user content of the document, monitoring feedback from the user on the document, updating the social data associated with the document based on the feedback from the user.

13. The medium of claim 12, wherein the information, when read by the machine, further causes the machine to perform the following steps:

if the input is a request to review a private note in the private information created previously by the user with respect to the document, retrieving the previously created private note, providing to the user the retrieved private note.

14. The medium of claim 13, wherein the information, when read by the machine, further causes the machine to perform the following steps:

if the user requests to privately evaluate the document, receiving information from the user representing a private evaluation of the document, and updating the private information associated with the user with respect to the document based on the private evaluation, and updating the social data associated with the document based on the private evaluation from the user; and if the user requests to privately evaluate the document, facilitating the user to create a private note about the document, updating the private information associated with the user with respect to the document based on the private note.

15. A system, comprising:

a user interaction unit implemented by a processor and configured for receiving a query from a user; and a content search engine implemented by a processor and configured for searching content based on the query, wherein the content that matches the query includes a plurality of documents, with respect each of the plurality of documents, obtaining social data associated with the document, wherein the social data represents public evaluation of the document, retrieving accessible private information provided by the user previously with respect to the document to assess the document, and generating an enhanced record including the document and enriched information thereof which includes the social data and accessible private information, and generating an enhanced search result based on the plurality of enhanced records, wherein the user interaction unit is further configured for presenting the enhanced search result on a webpage to the user in response to the query, wherein the presented enhanced search result includes each of the plurality of documents, the corresponding social data, and the corresponding accessible private information, and wherein the document, the corresponding social data, and the corresponding accessible private information are displayed separately from each other on the webpage.

16. The system of claim 15, wherein the social data associated with the document comprises statistics which includes:

a total number of hits of the document in different searches, a total number of times that the document is reviewed, a total number of positive feedback by viewers, and a total number of negative feedback by viewers; and the private information associated with the document includes at least one of:

a private assessment of the document, and a private note that the user previously created for the document, wherein the private information directed to the document is to be provided only to the user, and the private assessment indicates whether the user likes or dislikes the document.

17. The system of claim 15, wherein the enriched information related to the document is to be displayed together:

the social data in the enriched information represents a public assessment of the document; and the private information in the enriched information, if existing, presents a private evaluation previously made by the user about the document.

18. The system of claim 15, wherein the content search engine is further configured for:

receiving an input from the user after the enhanced search result is provided to the user;

when the input is a request to review one of the plurality of documents, providing the user content of the document, monitoring feedback from the user on the document, updating the social data associated with the document based on the feedback from the user.

19. The system of claim 18, wherein the content search engine is further configured for:

if the input is a request to review a private note in the private information created previously by the user with respect to the document, obtaining the previously created private note, providing to the user the retrieved private note.

20. The system of claim 19, wherein the content search engine is further configured for, if the user requests to privately evaluate the document, receiving information from the user representing a private evaluation of the document, and updating the private information associated with the user with respect to the document based on the private evaluation, and updating the social data associated with the document based on the private evaluation from the user; and if the user requests to privately evaluate the document, facilitating the user to create a private note about the document, updating the private information associated with the user with respect to the document based on the private note.

\* \* \* \* \*